UNITED STATES PATENT OFFICE.

ALFRED O. BLAICH, OF CHICAGO, ILLINOIS, ASSIGNOR TO ALFRED O. BLAICH COMPANY, OF CHICAGO, ILLINOIS, A CORPORATION OF ILLINOIS.

PROCESS OF MAKING CASE-HARDENING MATERIAL.

1,248,604. Specification of Letters Patent. Patented Dec. 4, 1917.

No Drawing. Continuation in part of application Serial No. 145,140, filed January 29, 1917. This application filed September 18, 1917. Serial No. 192,039.

*To all whom it may concern:*

Be it known that I, ALFRED O. BLAICH, a citizen of the United States, residing at Chicago, in the county of Cook and the State of Illinois, have invented new and useful Improvements in Processes of Making Case-Hardening Material, of which the following is a specification.

This application is a continuation of my application, No. 145,140, filed January 29, 1917. The purpose of this invention is to provide an improved process of making case hardening material of substantially dry granular form. It consists in the employment of the several materials and their combination by the several steps hereinafter set forth, substantially as indicated in the claims.

I aim by the present invention to produce a case hardening material which shall be of substantially dry granular form and of which each granule shall consist of or carry carbonaceous material and energizing material aggregated therewith in proper proportion to render it effective for the purpose of case hardening; and I intend to distinguish such substantially dry granular case hardening material of which the granules are severally characterized as stated, both from a mixture of carbon granules and energizing granules or dust in dry form, (even though the granular carbonaceous material and the granular or pulverized energizing material are in the total mixture definitely proportioned to each other), and also from a mixture of carbonaceous material and energizing material, in whatever proportions, of substantially pasty character, that is, wherein the carbonaceous material and the energizing material are held in aggregated mass by liquid or semi-liquid substance; and the essential difference between the product which it is the purpose of the present process to produce, and such mixtures as these two last indicated is, that each separated granule of the product resulting from this process of making carries with it all the elements necessary for effective case hardening.

I prefer to employ as the carbonaceous material, ground charcoal or ground coke, though any other carbonaceous material adapted to be reduced to granules may be employed. The carbonaceous granules are first placed in a retort where they are subjected to a temperature of about 1,400° F., though a less temperature will suffice for the purpose of shrinking the granules and depriving them as completely as possible of moisture. This result is substantially obtained by the time the granules have reached the temperature of the retort. The contents of the retort are then discharged into a tray or trough where the mass of granules may be considerably spread out and a solution of about 15% soda ash in hot water is sprayed upon the hot granules to an extent sufficient to cause them all to be thoroughly moistened, but without leaving any surplus moisture after the granules have absorbed into their pores all that can be thus taken, amounting to about 6% by weight. The mass of soda-ash impregnated granules is then further spread out and allowed to cool, in which process any small excess of moisture on the surface will be evaporated. It will be understood that the temperature to which the soda ash is exposed by being sprayed as described upon the carbon granules hot from the shrinking retort is far below that which would cause fusion of the soda ash, and that such fusion is not accomplished nor desired in the process. The dried soda-ash-impregnated carbonaceous granules are then mixed with powdered calcium carbonate or barium carbonate or both by mechanically stirring the two dry substances together, continuing the process long enough to cause the carbon granules to become coated with the powdered carbonate which will adhere to the dry porous carbon granules. The quantity of the powdered carbonate thus mechanically mixed with the soda-ash-saturated carbon granules should not be materially more than will thus adhere to the surface of the granules upon thorough mechanical intermixture of the two, it not being desirable that any excess of free calcium carbonate or barium carbonate should remain beyond what adheres to the carbon granules.

Between the cooling of the soda-ash-impregnated carbonaceous granules and the final step of mechanical mixture with the calcium carbonate or barium carbonate dust, there may be advantageously interposed another step consisting in giving to the soda-ash - impregnated carbonaceous granules a surfacing of oily tenacious liquid for the purpose of preventing them from absorbing moisture, and also assisting in causing the calcium carbonate or barium carbonate dust to adhere. Such oil-surfacing may most easily be accomplished by spraying the soda-ash-impregnated carbonaceous granules as they lie spread out for cooling with a light spray of oily and somewhat tenacious liquid, and stirring the mass to cause all the granules to receive a proper coating without leaving any excess or free liquid in the interstices of the mass. When this step is interposed, the final step will be performed precisely in the same manner as above described,—that is, by mechanically mixing the soda-ash-impregnated carbonaceous granules with the pulverized calcium carbonate or barium carbonate by stirring the two masses together.

It will be understood that the function of the soda ash is to energize the carbonaceous granules;—that is, to cause them to facilitate action in the case-hardening process; and the purpose of the calcium carbonate or barium carbonate is substantially the same in general; but advantage is found that in the employment of the two energizers, one with which the carbonaceous granules are impregnated, and the other with which they are coated.

In my co-pending application, No. 145,141, filed simultaneously with said application Serial No. 145,140, I have claimed a case-hardening material such as would result from the employment of the process hereinabove described, a different process of producing the same being set out in said co-pending application; and said case hardening material, as such, is not claimed in this application.

I claim:

1. The process of making case-hardening material which comprises the following steps: shrinking and drying granular carbonaceous material by subjecting it in a retort to a temperature above 1,000° F.; next, impregnating the dried and shrunken granules with an energizer which is infusible at the temperature employed by absorption thereinto of liquid solution of such energizer; finally, mechanically mixing the impregnated granules with a pulverulent energizer.

2. The process of making case-hardening material which comprises the following steps; first, thoroughly shrinking and drying carbon granules by subjecting them in a retort to a temperature above 1,000° F.; next, impregnating the dried and shrunken granules with soda ash by absorption thereinto of a hot liquid solution of soda ash; finally, mechanically mixing the soda-ash-impregnated carbon granules with pulverized calcium or barium carbonate.

3. The process of making case-hardening material which comprises the following steps; first, shrinking and drying carbon granules by exposing them in a retort to a temperature above 1,000° F.; next, spraying the hot, shrunken and dried carbon granules with an approximately fifteen per-cent. soda ash solution in hot water; next, allowing the shrunken and sprayed granules to cool slowly; finally, mechanically mixing the soda-ash-impregnated granules with powdered calcium or barium carbonate.

4. The process of making case-hardening material which comprises the following steps; first, shrinking and drying carbonaceous granules by subjecting them in a retort to a temperature above 1,000° F.; next, impregnating the dried and shrunken granules with an energizer which is infusible at the temperature employed by absorption into said granules of a liquid solution containing said energizer; thirdly, applying a surfacing of oily liquid to the impregnated granules; and finally, mechanically mixing the oily-surfaced granules with a pulverized energizer.

In testimony whereof, I have hereunto set my hand at Chicago, Illinois, this 14th day of September, 1917.

ALFRED O. BLAICH.